United States Patent [19]

Weller et al.

[11] Patent Number: 5,440,725

[45] Date of Patent: Aug. 8, 1995

[54] MICROPROCESSOR CIRCUIT ARRANGEMENT WITH WATCHDOG CIRCUIT

[75] Inventors: Hugo Weller, Oberriexiengen; Peter Taufer, Renningen; Knut Balzer, Ludwigburg-Pflugfelden; Wilfried Burger, Hemmingen, all of Germany

[73] Assignee: Robert Bosch GmbH, Germany

[21] Appl. No.: 245,514

[22] Filed: May 18, 1994

Related U.S. Application Data

[63] Continuation of Ser. No. 768,652, Oct. 2, 1991, abandoned. Filed as PCT/DE90/00407, May 31, 1990.

[30] Foreign Application Priority Data

Jun. 24, 1989 [DE] Germany ............... 39 20 696.3

[51] Int. Cl.⁶ ............................................. G06F 11/00
[52] U.S. Cl. ........................................... 395/185.08
[58] Field of Search ........................ 371/16.3, 12; 364/267.9; 395/575

[56] References Cited

U.S. PATENT DOCUMENTS

| | | | |
|---|---|---|---|
| 4,586,179 | 4/1986 | Sirazi et al. | 371/12 |
| 4,727,549 | 2/1988 | Tulpule et al. | 371/62 |
| 4,759,592 | 7/1988 | Dahnert | 312/201 |
| 4,803,682 | 2/1989 | Hara et al. | 371/12 |
| 4,811,200 | 3/1989 | Wagner et al. | 364/200 |
| 4,866,713 | 9/1989 | Worger et al. | 371/16.3 |
| 4,879,647 | 11/1989 | Yazawa | 364/200 |
| 4,906,979 | 3/1990 | Kimura | 340/658 |
| 4,912,708 | 3/1990 | Wendt | 371/16.3 |
| 5,182,755 | 1/1993 | Sekiguchi et al. | 371/16.3 |

FOREIGN PATENT DOCUMENTS

| | | | |
|---|---|---|---|
| 0266837 | 5/1988 | European Pat. Off. | G06F 11/00 |
| 58-211255 | 3/1984 | Japan | G06F 11/30 |

*Primary Examiner*—Robert W. Beausoliel, Jr.
*Assistant Examiner*—Stephen C. Elmore
*Attorney, Agent, or Firm*—Kenyon & Kenyon

[57] ABSTRACT

The invention relates to a microprocessor circuit arrangement having a watchdog circuit, which monitors the proper program flow for the processor and which must be triggered in specific time intervals by the microprocessor, since otherwise it will reset (reset function) the microprocessor to the program start or the like. For reasons of simplification, it is proposed that when the microprocessor (2) recognizes that a malfunction has occurred, it spuriously triggers the watchdog circuit (5) in a selective manner to release a reset function coming from the watchdog circuit (5).

12 Claims, 1 Drawing Sheet

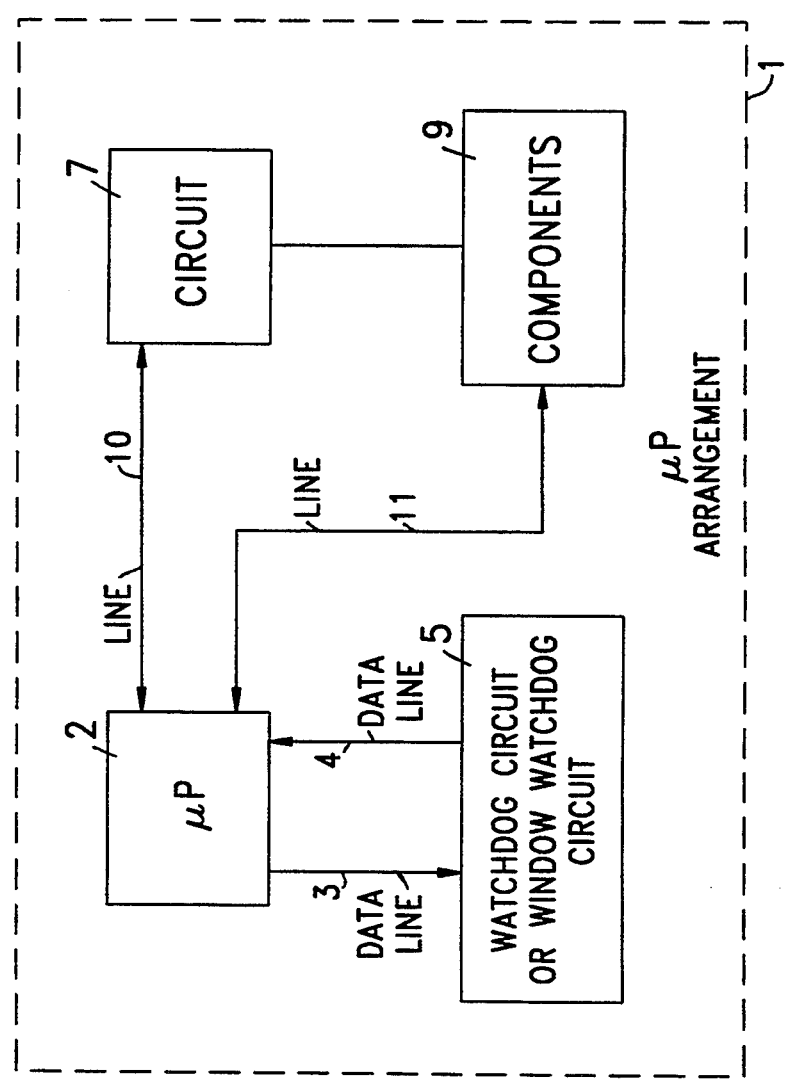

MICROPROCESSOR CIRCUIT ARRANGEMENT WITH WATCHDOG CIRCUIT

This is a continuation of application Ser. No. 07/768,652 filed on Oct. 2, 1991, now abandoned. Filed as PCT/DE90/00407, May 31, 1990.

FIELD OF THE INVENTION

The present invention relates to a microprocessor circuit arrangement having a watchdog circuit, which monitors the proper program flow for the processor, and must be triggered in specific time intervals by the microprocessor, since otherwise it will reset (reset function) the microprocessor to the program start or the like.

BACKGROUND OF THE INVENTION

It is generally known to install watchdog circuits in microprocessor circuit arrangements to monitor the program flow for the processor. When the programs run correctly, the microprocessor triggers the watchdog circuit in specific time intervals. This enables the microprocessor's program flow to continue without hindrance. If there is a malfunction, however, for example because the microprocessor "gets hung up", the watchdog circuit is no longer triggered. This induces the watchdog circuit to emit a reset pulse which is then fed to the microprocessor. By this means, the microprocessor is reset to the program start or to a predetermined point in the program (reset function).

U.S. Pat. No. 4,803,682 discloses a microprocessor circuit arrangement with a watchdog circuit that monitors the correct processor program flow. An additional reset signal is generated when transmission errors occur in succession between a first microprocessor circuit and other subordinate microprocessor circuits, whereby all the microprocessor circuits are connected by means of a mutual transmission line. If one of the reset signals appears, the multitude of subordinate microprocessor circuits is reset.

In the case of the monitoring watchdog circuit according to the publication, *Patent Abstracts of Japan*, vol. 8, no. 60 (P-262) (1497), Mar. 22, 1984 & JP-A-58 211 255, the watchdog circuit is designed as a special microcomputer, which resets other microcomputers, in case they continue to run without emitting specific pulse sequences within a specific period of time at their output.

In addition, U.S. Pat. No. 4,586,179 discloses a voltage-level monitoring, which resets the microprocessor in case the input voltage falls under a certain value. A starting-curring monitoring, which is coupled between the voltage-level monitoring and the watchdog circuit, guarantees that a subsequently added reset-trigger switch keeps the microprocessor in the reset state, until the input voltage reaches a certain level, which allows a normal microprocessor operation.

Finally, the data processing system according to the publication EP-A-O 266 837 contains a clocked counter as a watchdog timer, whose first output is coupled to a reset input of the microcomputer. To increase the number of malfunctions which the watchdog circuit reacts to, the microcomputer is equipped to repeatedly generate reset-signal bytes within a certain timing window, whereby these timing windows correspond to periods of time during which another output of the counter is set to logic "1". However, such malfunctions can only be recognized when the entire data processing system is in the write mode. The microcomputer is reset in this write mode, when a byte output by the microprocessor does not conform to a byte stored, for example, in the RAM. Thus, the microprocessor is prevented from mistakenly running through a program part, in which relevant storage locations are then overwritten. In this case, an additional reset signal is automatically generated for the microcomputer.

SUMMARY OF THE INVENTION

A feature of the circuit arrangement according to the invention is that when the microprocessor recognizes that a malfunction has occurred, it releases a reset function by spuriously triggering the watchdog circuit, thus causing the watchdog circuit to emit a reset pulse. By this means, the microprocessor is reset to its program start or to a predetermined point of the program. Since, according to the invention, the watchdog circuit is doubly utilized, one can do without the reset circuit that is normally required to generate the reset pulse for the monitoring function of the microprocessor, as mentioned. By discontinuing the reset circuit, one can cut down on component parts. In addition, the circuit construction and assembly are simplified accordingly. Furthermore, the overall space required for the microprocessor circuit arrangement according to the invention is also reduced since fewer component parts are used.

A further development of the invention foresees designing the watchdog circuit as a window watchdog circuit. When the processor programs run perfectly, the watchdog circuit is triggered by the microprocessor within the timing window. If the microprocessor undertakes the spurious triggering in accordance with the invention, such a triggering takes place outside of the timing window. The spurious triggering by the microprocessor can preferably take place as the result of the watchdog circuit being operated (triggered) more often than a predetermined limit relative to the timing window, so that trigger pulses occur, outside of the timing window. When trigger pulses occur outside of the timing window, the reset function will be released at the latest immediately after a second control operation thereby resetting the microprocessor to its program start or to a predetermined point in the program.

According to a further development of the invention, the microprocessor monitors its own malfunctions and/or malfunctions in other components and/or in component parts. Thus the reset function provided according to the teachings of the invention is not released when there are errors in the program flow. Rather—unlike prior art—it is always released when the microprocessor recognizes an error other than an error in the program flow and considers it necessary to interrupt the program run in order to start it once more through its selective, spurious triggering of the watchdog circuit.

The invention is also characterized by a method for monitoring the correct processor program flow of a microprocessor circuit arrangement provided with a watchdog circuit, whereby the microprocessor triggers the watchdog circuit in specific time intervals, since otherwise it will reset (reset function) the microprocessor to the program start or the like, and whereby when the microprocessor recognizes that a malfunction has occurred, it spuriously triggers the watchdog circuit in a selective manner to release a reset function coming from the watchdog circuit.

BRIEF DESCRIPTION OF THE DRAWINGS

The invention shall be clarified in greater detail in the following based on the FIGURE. The FIGURE depicts a block diagram of a microprocessor circuit arrangement.

DETAILED DESCRIPTION

According to the FIGURE, the microprocessor circuit arrangement 1 shows a microprocessor 2, which is connected via data lines 3 and 4 to a watchdog circuit 5. The watchdog circuit 5 can be, for example a window watchdog circuit.

In addition, a circuit 7 represents a component part of the microprocessor circuit arrangement 1. Several such component parts 7 can be provided, whereby in the FIGURE, however, only one is depicted.

Furthermore, the microprocessor circuit arrangement 1 exhibits components 9. These components 9 constitute part of the entire circuit; therefore, they can belong to the circuit-arrangement component part or parts 7 or to other subassemblies or modules. In this case, it is a question of components that are critical to the system and whose function is supposed to be monitored. The microprocessor 2 is connected via a line 10 to the circuit-arrangement component part 7 and via a line 11 to the components 9. The microprocessor circuit arrangement 1 has the following functions:

In normal operation, the microprocessor 2 triggers the watchdog circuit 5 in specific time intervals via the data line 3. If there is an error in the program flow, this program-controlled triggering is dropped. This causes the watchdog circuit 5 to generate a reset pulse which is then fed via the data line 4 to the microprocessor 2. By this means, the microprocessor 2 is reset (reset function) to its program start or the like.

At this point, the invention provides that not only the previously described processor program flow is monitored, but other functions of the microprocessor circuit arrangement 1 are monitored by the microprocessor as well. If a malfunction occurs, for example, in the microprocessor 2 itself, or however in a circuit-arrangement component part 7 or in a component 9, and this is recognized by the microprocessor 2, then this microprocessor spuriously triggers the watchdog circuit 5 via the data line 3 in such a way, that the watchdog circuit 5 generates a reset pulse and feeds this pulse via the data line 4 to the microprocessor 2, through which means the processor program flow is stopped. Consequently, via the lines 10 and 11, the microprocessor 2 constantly queries the circuit 7 as well as the components 9 to be monitored to check for proper functioning. In addition, it also tests its own internal functioning.

Preferably, the microprocessor 2 spuriously triggers the watchdog circuit 5 in such a way, that it undertakes the trigger control operations outside of the timing windows of the watchdog circuit 5 designed as a window watchdog circuit. It is particularly advantageous for trigger pulses to appear which lie between the timing windows of the window watchdog circuit. At the latest then, immediately after the second triggering operation, this causes the reset pulse to be generated, which resets the microprocessor 2.

Accordingly, to monitor malfunctions as described, the circuit arrangement according to the invention does not require a separate reset circuit to generate the necessary reset pulse. This is because by selectively, spuriously triggering the watchdog circuit 5, according to the invention, the watchdog circuit 5 takes part in assuming the task of generating reset pulses. In this respect, the circuit design is simplified, and component parts can also be economized.

We claim:

1. A microprocessor system for resetting a microprocessor upon detection of malfunctions, the microprocessor system comprising:

a microprocessor, the microprocessor monitoring the microprocessor system and detecting whether at least one malfunction has occurred in the microprocessor system, the microprocessor outputting trigger pulses at a first rate when no malfunction is detected, the microprocessor outputting trigger pulses at a predetermined second rate different from the first rate when a malfunction is detected;

a watchdog circuit coupled to the microprocessor, the watchdog circuit receiving the trigger pulses from the microprocessor, the watchdog circuit sending a reset signal to the microprocessor when the trigger pulses from the microprocessor are not received at the first rate.

2. The microprocessor system according to claim 1, wherein the microprocessor monitors its own malfunctions.

3. The microprocessor system according to claim 1, further comprising at least one component coupled to the microprocessor, the microprocessor monitoring malfunctions in the microprocessor and in the at least one component.

4. A microprocessor system for resetting a microprocessor upon detection of malfunctions, the microprocessor system comprising:

a microprocessor, the microprocessor monitoring the microprocessor system and detecting whether at least one malfunction has occurred in the microprocessor system, the microprocessor outputting trigger pulses at a first rate so as to fall within a preselected timing window when no malfunction is detected, the microprocessor outputting trigger pulses at a predetermined second rate, different from the first rate, so as to fall outside the preselected timing window when a malfunction is detected;

a window watchdog circuit coupled to the microprocessor, the window watchdog circuit receiving the trigger pulses from the microprocessor, the window watchdog circuit sending a reset signal to the microprocessor when the trigger pulses from the microprocessor are not received within the preselected timing window.

5. The microprocessor system according to claim 4, wherein the microprocessor monitors its own malfunctions.

6. The microprocessor system according to claim 4, further comprising at least one component coupled to the microprocessor, the microprocessor monitoring malfunctions in the microprocessor and in the at least one component.

7. In a microprocessor system including a microprocessor and a watchdog circuit, a method of resetting the microprocessor upon detection of malfunctions, the method comprising the steps of:

monitoring the microprocessor system in order to detect malfunctions;

providing trigger pulses from the microprocessor to the watchdog circuit at a first rate when no malfunction is detected in the microprocessor system;

providing trigger pulses from the microprocessor to the watchdog circuit at a predetermined second rate different from the first rate when a malfunction is detected in the microprocessor system;

providing a reset pulse from the watchdog circuit to the microprocessor when the watchdog circuit fails to receive trigger pulses at the first rate.

8. The method according to claim 7, wherein the step of monitoring further includes monitoring, in the microprocessor, malfunctions of the microprocessor.

9. The method according to claim 7, wherein the microprocessor system includes at least one component and wherein the step of monitoring further includes monitoring, in the microprocessor, malfunctions in the microprocessor and in the at least one component.

10. In a microprocessor system including a microprocessor and a window watchdog circuit, a method of resetting the microprocessor upon detection of malfunctions, the method comprising the steps of:

monitoring the microprocessor system and detecting whether at least one malfunction has occurred in the microprocessor system;

providing trigger pulses from the microprocessor to the window watchdog circuit at a first rate so as to fall within a preselected timing window when no malfunction is detected in the microprocessor system;

providing trigger pulses from the microprocessor to the window watchdog circuit at a predetermined second rate, different from the first rate, so as to fall outside the preselected timing window when a malfunction is detected in the microprocessor system;

providing a reset pulse from the window watchdog circuit to the microprocessor when the window watchdog circuit fails to receive trigger pulses within the preselected timing window.

11. The method according to claim 10, wherein the step of monitoring further includes monitoring, in the microprocessor, malfunctions of the microprocessor.

12. The method according to claim 10, wherein the microprocessor system includes at least one component and wherein the step of monitoring further includes monitoring, in the microprocessor, malfunctions in the microprocessor and in the at least one component.

* * * * *